United States Patent [19]

Hochstein et al.

[11] Patent Number: 5,568,136

[45] Date of Patent: Oct. 22, 1996

[54] METHOD AND APPARATUS FOR IDENTIFYING AND MEASURING THE DISTANCE BETWEEN VEHICLES

[76] Inventors: Peter A. Hochstein, 2966 River Valley Dr., Troy, Mich. 48098; Dennis Foy, 5703 N. Paradise View, Scottsdale, Ariz. 85250

[21] Appl. No.: 523,543

[22] Filed: Sep. 5, 1995

[51] Int. Cl.⁶ .................................................. G08G 1/16
[52] U.S. Cl. ........................................ 340/903; 340/435
[58] Field of Search ........................... 356/4.03; 340/901, 340/903, 435, 436, 555, 556

[56] References Cited

U.S. PATENT DOCUMENTS

| | | | |
|---|---|---|---|
| 3,152,317 | 10/1964 | Mayer | 340/34 |
| 3,340,763 | 9/1967 | Power | 88/1 |
| 4,004,852 | 1/1977 | Pentecost | 356/1 |
| 4,410,261 | 10/1983 | Masunaga et al. | 356/1 |
| 4,766,421 | 8/1988 | Beggs et al. | 340/904 |
| 4,891,624 | 1/1990 | Ishikawa et al. | 340/436 |
| 5,026,153 | 6/1991 | Suzuki et al. | 356/1 |
| 5,177,462 | 1/1993 | Kajiwara | 340/435 |
| 5,249,027 | 9/1993 | Mathur et al. | 356/1 |
| 5,249,157 | 9/1993 | Taylor | 340/903 |

*Primary Examiner*—Jeffrey Hofsass
*Assistant Examiner*—Timothy Edwards, Jr.
*Attorney, Agent, or Firm*—Howard & Howard

[57] ABSTRACT

A method of measuring the distance between vehicles comprising the steps of; emitting light (14) from a first vehicle to define first and second light positions spaced apart a predetermined light distance (L), passing the emitted light through a lens (20) mounted on a second vehicle and having a focal length (f) to present an image (I) of the predetermined light distance (L) at the focal length (f) from the lens, sensing (22) the image (I) at the focal length, producing a signal representing the length of the image (I), storing a scale (28) on the second vehicle which is proportional to the predetermined light distance (L), comparing (26) the length of the image (I) with the scale to produce a signal representing the distance (D) between the vehicles. The method and apparatus is characterized by establishing the predetermined light distance (L) as a constant and fixed length from vehicle to vehicle by using the standard license plate or license plate holder on the first vehicle.

16 Claims, 3 Drawing Sheets

5,568,136

METHOD AND APPARATUS FOR IDENTIFYING AND MEASURING THE DISTANCE BETWEEN VEHICLES

TECHNICAL FIELD

This invention relates to a vehicle identifying and distance measuring system of the type utilizing light transmitted between vehicles.

BACKGROUND ART

One prior art system utilizes an angular measuring device to measure the angle between two fight beams incident to an observation point. The light beams are produced by two light sources spaced apart on a vehicle. The angular difference between these two light beams near the observation point is the angular range and if the distance between the two light sources is known, the distance from the observer to the light sources can be calculated. Such a system is disclosed in U.S. Pat. Nos. 3,152,317 to D. W. Mayer and 3,340,763, to R. B. Power.

A system is disclosed in U.S. Pat. No. 5,177,462 to Kajiwara which utilizes a lens to receive a spot of reflected light and to focus an image of that spot on a light receiving element. The light emitting device and the lens are supported on the same vehicle and the distance to the vehicle reflecting the spot of emitted light is determined by triangulation using the distance between the light emitting device and the lens.

Yet another prior art system is disclosed in U.S. Pat. No. 5,249,027 to Mathur et al in which two spaced apart fight emitters on one vehicle transmit light trough a plurality of lens and onto a single sensor. As the patent points out this is the less desirable embodiment because the inter-vehicle distance is a function of the mounting distance between the two emitters. This is undesirable because each vehicle would have to rely on the correct (i.e., constant) separation distance between emitters on all other vehicles.

SUMMARY OF THE INVENTION

A method of measuring the distance between vehicles comprising the steps of; emitting light from a first vehicle to define first and second light positions spaced apart a predetermined light distance (L), passing the emitted light through a lens mounted on a second vehicle and having a focal length (f) to present an image (I) of the predetermined light distance (L) at the focal length (f) from the lens, sensing the image (I) at the focal length, producing a signal representing the length of the image (I), storing a scale on the second vehicle which is proportional to the predetermined light distance (L), and comparing the length of the image (I) with the scale to produce a signal representing the distance (D) between the vehicles. The invention is characterized by establishing the predetermined fight distance (L) as a constant and fixed length from vehicle to vehicle by using the standard license plate holder on the first vehicle.

The apparatus to carry out the invention includes using the standard license plate holder for mounting the two spaced apart light emitters, which in one embodiment could be the license plate itself.

Since the license plate holders for all road vehicles in the United States, and other countries, are one predetermined or constant size from vehicle to vehicle, the invention utilizes this constant size for positioning the two light emitters a constant distance apart from vehicle to vehicle.

BRIEF DESCRIPTION OF THE DRAWINGS

Other advantages of the present invention will become readily appreciated as the same becomes better understood by reference to the following detailed description when considered in connection with the accompanying drawings wherein.

DETAILED DESCRIPTION OF PREFERRED EMBODIMENT

Figure 1:
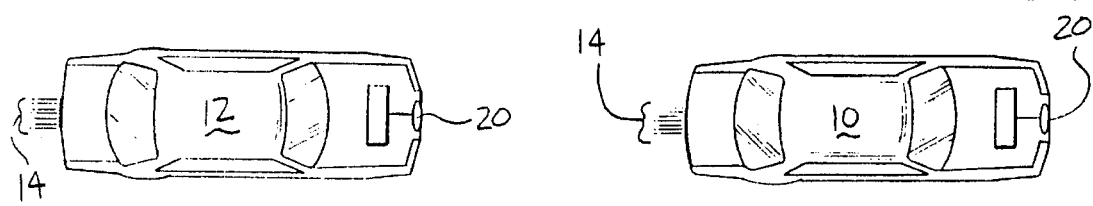
FIG. 1 is a schematic showing two vehicles moving along a highway.
Figure 2:
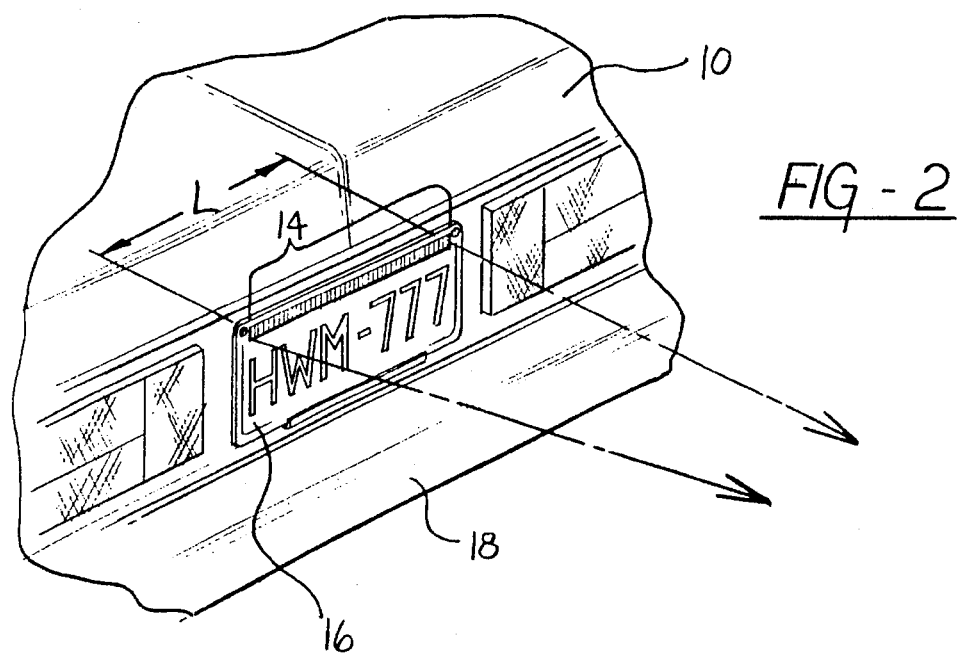
FIG. 2 is a perspective view showing the light emitters on the license plate of the lead vehicle.

An apparatus is shown in FIG. 1 for measuring the distance between a first vehicle 10 and a second vehicle 12.

A light emitting means 14, comprising light emitting diodes (LED), are supported on the license plate holder of the leading or first vehicle 10 for emitting light (dashed lines) from the first vehicle. In the preferred embodiment, a linear plurality of light emitting diodes 14 are disposed in a straight linear string across the top of the license plate 16, which is, in turn, mounted to license plate bracket of the vehicle 10, above its bumper 18 the string of LEDs produce a predetermined light distance (L) the extremes of which are disposed at first and second light positions spaced apart the predetermined light distance (L). Accordingly, the standard license plate holder is used for establishing the predetermined light distance (L) as a constant and fixed length from vehicle to vehicle. This may be accomplished by using the standard distance between mounting holes or by the standard size of the license plates, or a standard attached to the license plates.

Figure 3:
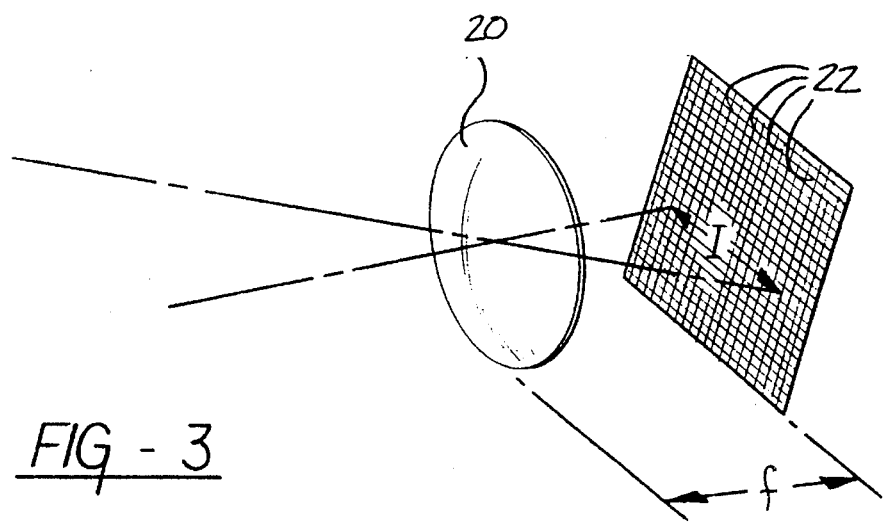
FIG. 3 is a perspective view showing the detection system on the front of the following vehicle.
Figure 4:
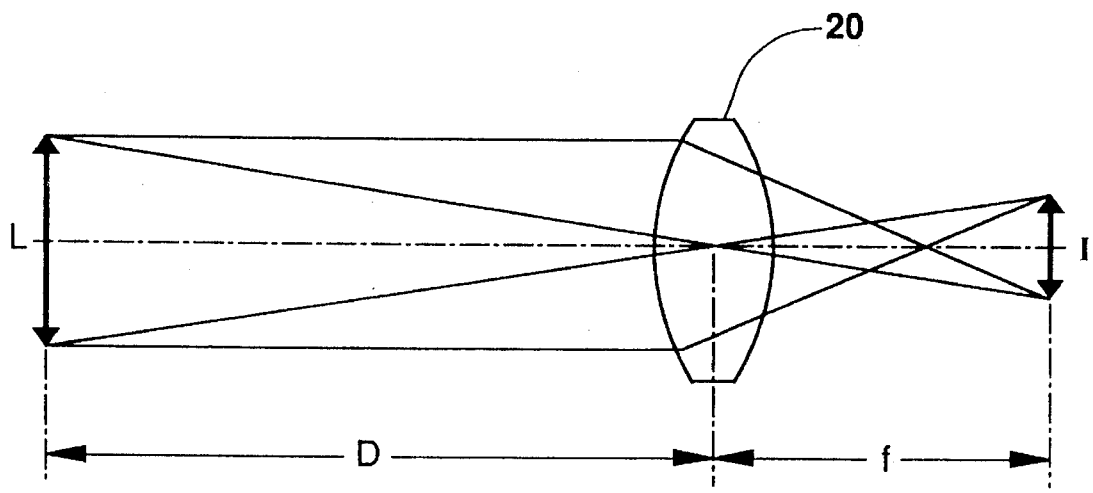
FIG. 4 is a schematic view of the interaction between the two vehicles.

An optical lens 20 is mounted on the front end of the rear or second vehicle 12 and has a focal length (f) for passing the emitted light therethrough to present an image (I) of the predetermined light distance (L) at the focal length (f) from the lens. A sensing means is supported on the second vehicle for sensing the image (I) at the focal length f. The sensing means comprises a two dimensional array of photo diodes 22 for sensing the linear image length I. Because the photo diodes 22 are disposed in parallel rows to define a two dimensional rectangle, the diodes sense the image length I independently of the angle of the predetermined light distance (L) relative to the horizontal, as shown in dashed lines on the sensing means 22 in FIG. 3. In other words, the sensing means 22 can determine the length of the image I regardless of the relative angle between the axis of the string of LEDs 14 and the cross axis of the sensing matrix 22. Accordingly, the both vehicles do not have to be on level ground, one can be at an angle to horizontal, e.g., parked at a curb. Alternatively, the matrix or detector 22 may consist of a single line array of photo diodes as is used in facsimile machines to read documents line by line. A single line (one dimensional) array of photodiodes may be used, but only if a special lens is used to image the light emitting diodes. The use of and asymetric lens permits the horizontal component of the image length (L) to be accurately reproduced, while smearing the image in the vertical axis, so as to accommodate misalignments in the vertical plane. A typical detector may have up to 1024 individual cells with a pixel (image element) spacing of 1 mil (0.02 mm) in as 25 mm long detector. Such sensors may be used to unambiguously locate a one pixel wide image to an accuracy of 0.1% of the field of view. As illustrated, however, the pixels are disposed in a two dimensional array.

Figure 5:
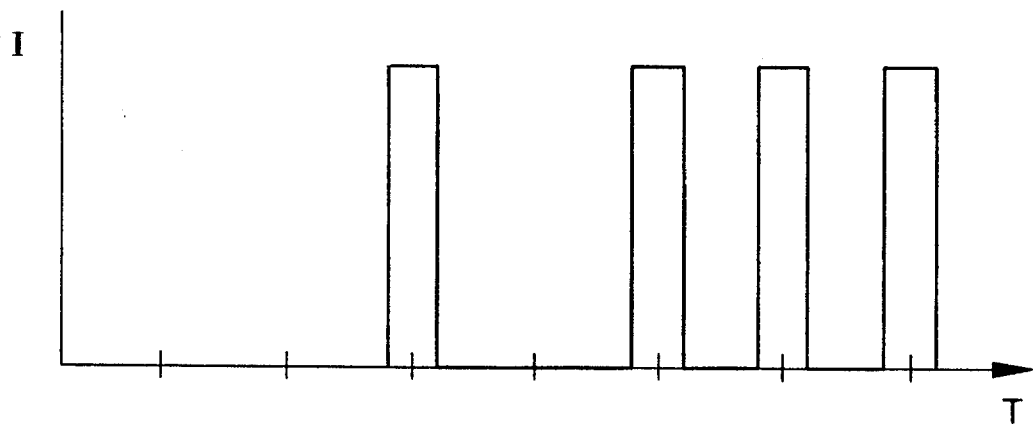
FIG. 5 illustrates the encoded signal of the pulsed light waves.
Figure 6:
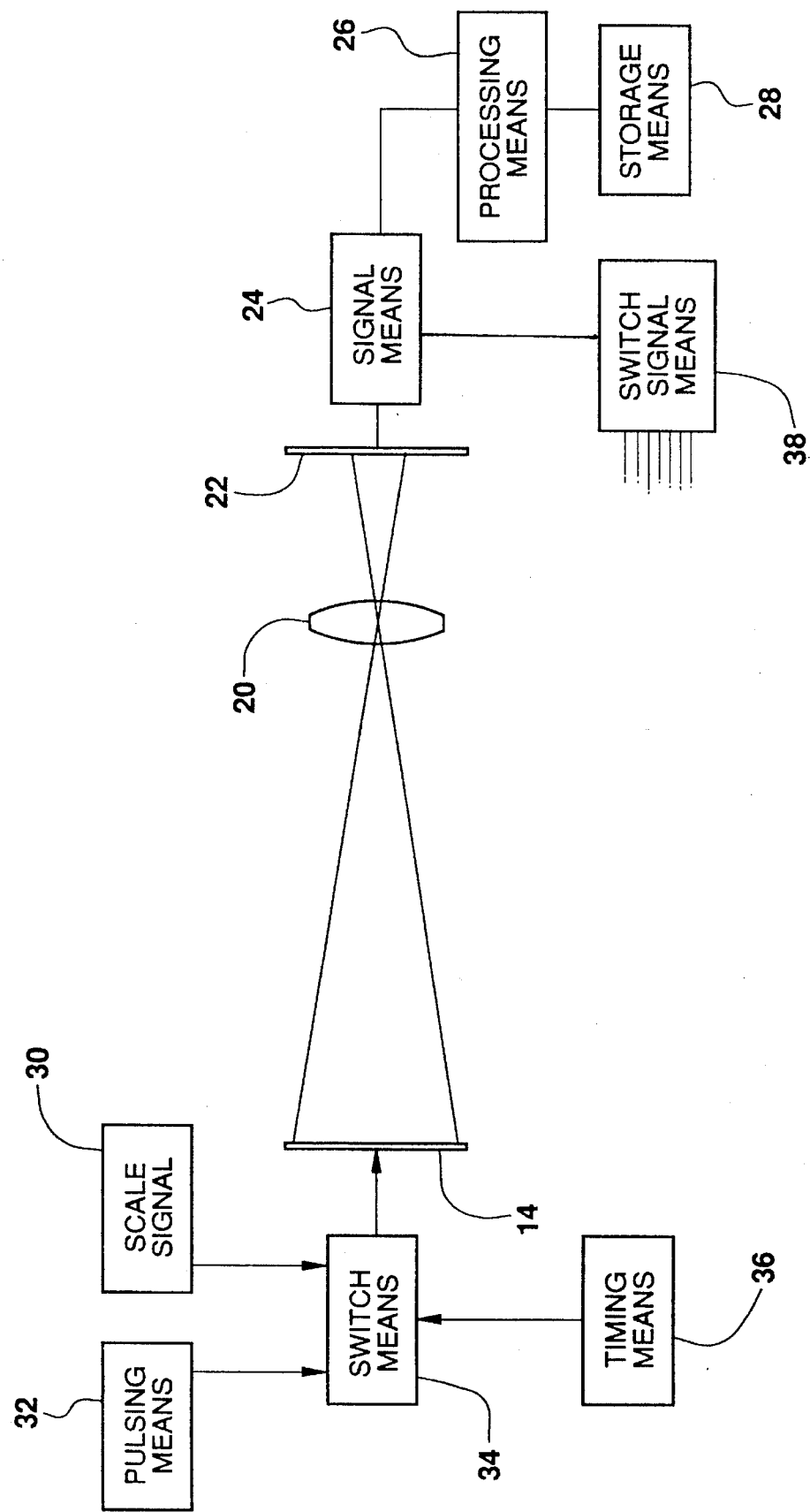
FIG. 6 is a block diagram representing the components used in the preferred embodiment.

A signal producing means 24 scans the matrix of pixels 22 for producing a signal representing the length of the image (I). A processing means 26 is supported on the second vehicle 12 for storing a scale on the second vehicle 12 which is proportional to the predetermined light distance (L) and for comparing the length of the image (I) with the scale to produce a signal representing the distance (D) between the vehicles. The processing means 26 includes storage means 28 for storing the scale as a function of the focal length (f) multiplied by the predetermined light distance (L). The formula is D=f(L/I). The storage means 28 stores a plurality of scales each a function of the focal length (f) multiplied by the predetermined light distance (L) for a plurality of light distances (L). The fixed distance L could one of a preprogramed plurality of distances L, in which case, a scale signal means 30 is included for sending a scale signal from the front vehicle 10 to the rear vehicle 12 to select the scale for the light distance employed on the first vehicle; of course, the focal length (f) must accumodate the changed image (I) size. 15. This is accomplished by pulsing means 32 on the first vehicle for pulsing the emitted light with encoded information as illustrated in FIG. 5 to identify the scale to be selected by the processing means 26. The encoded information may also identify the vehicle by vehicle number, engine number, license plate number, etc. A timing device could be inserted to effect the code to indicate when the license is expired. In other words, the registration of the vehicle could be encoded in the optical data bit stream to allow electronic registration. In addition, the operator could activate an emergency alarm.

A switch means is disposed in the circuit on the front vehicle 10 for switching power from the electrical system of the front vehicle on and off to initiate and terminate emitting light from the LEDs 14 of the front vehicle 10. The signal means 24 also sends a signal from the switch signal means 38 on the second or rear vehicle to the timing means 36 to switch the power on to produce the emitted light from the LEDs on the other vehicle. In this manner an approaching vehicle can interrogate a parked vehicle by first turning on the emitting system on the parked vehicle in order to read the signal.

In addition, a timing means 36 may be included on the light emitting vehicle for timing the power on periods to terminate the emitted light after predetermined periods. This will also conserve vehicle battery life.

The availability of high output infrared emitting diodes and IR laser diodes allows the light to be detected at a significant range. Modest receiving optics with relatively high f number keep the cost low, and narrow band IR receiving filters can be used to provide target selectivity and/or specificity. By operating at 880 nanometers or greater wavelength, solar flux interference is reduced, and range is enhanced by improving the signal to noise ratio. Silicon image detectors may be used.

At a minimum distance D of 1 m and the image I on the sensor matrix 22 no greater than 25 mm, the lens 20 must form an image with a ratio of 10:1. At D=10 m, the image I=2.5 mm, and at D=100 m, the image I=0.25 min. The resolving power of the matrix 22 is one pixel per 1/40 mm (typically 1024 photo diodes per inch). The importance of range resolution at the maximum range is evident when deriving the rate of closure. At 100 m or 300 ft an incremental change in measured vehicle distance D of 10 m or 30 ft represents a rate of change in velocity of approximately 20 mph if a reading is taken at least once per second. Naturally the incremental resolution improves linearly with diminishing range. At 20 m or 60 ft the same 1000 element sensor 22 will resolve 8 mph, and at 10 m or 30 ft the rate of closure sensitivity increases to 2 mph.

Accordingly, the invention includes a method of measuring the distance D between vehicles 10 and 12 comprising the steps of; emitting light 14 from a first vehicle to define first and second light positions spaced apart a predetermined light distance L, passing the emitted light through a lens 20, of focal length (f), mounted on a second vehicle 12 and to present an image I of the predetermined light distance L at the focal length f from the lens 20, sensing 22 the image I at the focal length, producing a signal 24 representing the length of the image L, storing a scale 28 on the second vehicle which is proportional to the predetermined light distance L, and comparing 26 the length of the image I with the scale to produce a signal representing the distance D between the vehicles. The method is characterized by establishing the predetermined light distance L as a constant and fixed length from vehicle to vehicle by using the standard license plate or license plate per se holder on the first vehicle, or by scale selection.

The scale is established in the storage means 28 as a function of the focal length f multiplied by the predetermined light distance L. The light distance (L) is defined with a linear plurality or straight string of light emitting diodes 14, or by two spaced light emitting diodes disposed at opposite ends of the license plate. The sensing of the length of the linear image I is accomplished with a two dimensional array of photo diodes 22 for sensing the linear length of the image independently of the angle of the predetermined light distance L relative to the horizontal. The emitting light 14 from the first vehicle is noncontinuous by switching power from the first vehicle on and off by the timing means 36. This switching is executed by sending a switching signal from a switch signal means 38 on the rear or approaching vehicle to the timing means 36 to switch the power on to produce the emitted light 14.

The method further includes the steps of timing the power on periods to terminate the emitted light after a predetermined period, pulsing the emitted light with encoded information to identify the first vehicle, and establishing a plurality of scales at the second vehicle for a plurality of light distances L and sending a signal from the first vehicle to select the scale for the light distance employed on the first vehicle.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A method of measuring the distance between vehicles comprising the steps of;

emitting light from first and second light positions spaced apart a predetermined light distance (L) on a first vehicle, passing the emitted light through a lens mourned on a second vehicle and having a focal length (f) to present an image having a length (I) of the predetermined light distance (L) at the focal length (f) from the lens, sensing the length of the image (I) at the focal length, producing a signal representing the length of the image (I), storing a scale on the second vehicle which is proportional to the predetermined light distance (L), comparing the length of the image (I) with the scale to produce a signal representing the distance (D) between the vehicles, characterized by establishing the predetermined light distance (L) as a constant and fixed length from vehicle to vehicle by using the standard license plate holder on the first vehicle.

2. A method as set forth in claim 1 further defined as establishing the scale as a function of the focal length (f) multiplied by the predetermined light distance (L).

3. A method as set forth in claim 2 further defined as emitting light from the first vehicle by switching power from the first vehicle on and off.

4. A method as set forth in claim 3 further defined as sending a signal from the second vehicle to switch the power on to produce the emitted light.

5. A method as set forth in claim 4 further defined as timing the power on periods to terminate the emitted light after a predetermined period.

6. A method as set forth in claim 2 further defined as establishing the light distance with a linear plurality of light emitting diodes and sensing the length of the linear image (I) with a two dimensional array of photo diodes for sensing the linear length of the image independently of the angle of the predetermined light distance (L) relative to the horizontal.

7. A method as set forth in claim 2 further defined as pulsing the emitted light with encoded information to identify the first vehicle.

8. A method as set forth in claim 2 further defined as establishing a plurality of scales at the second vehicle for a plurality of light distances (L) and sending a signal from the first vehicle to select the scale for the light distance employed on the first vehicle.

9. An apparatus for measuring the distance between first and second vehicles comprising;

light emitting means for emitting light at first and second light positions spaced apart a predetermined light distance (L) from the first vehicle, a single lens mounted on the second vehicle and having a focal length (f) for passing the emitted light therethrough to present an image (I) of the predetermined light distance (L) at the focal length (f) from the lens, sensing means for sensing the image (I) at the focal length of the single lens, signal producing means for producing a signal representing the length of the image (I), processing means on the second vehicle for storing a scale on the second vehicle which is proportional to the predetermined light distance (L) and for comparing the length of the image (I) with the scale to produce a signal representing the distance (D) between the vehicles, characterized by including the standard license plate holder on the first vehicle for establishing the predetermined light distance (L) as a constant and fixed length from vehicle to vehicle.

10. An apparatus as set forth in claim 9 including switch means on the first vehicle for switching power from the first vehicle on and off to initiate and terminate emitting light from the first vehicle.

11. An apparatus as set forth in claim 10 including signal means for sending a signal from the second vehicle to switch the power on to produce the emitted light.

12. An apparatus as set forth in claim 10 including timing means for timing the power on periods to terminate the emitted light after predetermined periods.

13. An apparatus as set forth in claim 9 wherein said processing means includes storage means for storing the scale as a function of the focal length (f) multiplied by the predetermined light distance (L).

14. An apparatus as set forth in claim 9 wherein said processing means is further defined as including a linear plurality of light emitting diodes to produce the predetermined fight distance (L), and a two dimensional array of photo diodes for sensing the linear image length independently of the angle of the predetermined light distance (L) relative to the horizontal.

15. An apparatus as set forth in claim 9 including pulsing means on the first vehicle for pulsing the emitted light with encoded information to identify the first vehicle.

16. An apparatus as set forth in claim 9 wherein said processing means includes storage means for storing a plurality of scales each a function of the focal length (f) multiplied by the predetermined light distance (L) for a plurality of light distances (L), and scale signal means for sending a scale signal from the first vehicle to the second vehicle to select the scale for the light distance employed on the first vehicle.

* * * * *